United States Patent [19]

Chuang

[11] Patent Number: 4,638,835

[45] Date of Patent: Jan. 27, 1987

[54] AUTOMATIC OVERFLOW CONTROL APPARATUS FOR THE PIPELINE PASSAGE

[76] Inventor: Rong-Chao Chuang, 113 Nan-Yang Road, Nan-Tsu, Kao Hsiung, Taiwan

[21] Appl. No.: 775,025

[22] Filed: Sep. 11, 1985

[51] Int. Cl.⁴ ............................................. F16K 17/24
[52] U.S. Cl. ................................ 137/519.5; 137/460; 137/533.11
[58] Field of Search ...................... 137/533.11, 533.13, 137/533.15, 539, 519.5, 460

[56] References Cited

U.S. PATENT DOCUMENTS

| | | | |
|---|---|---|---|
| 1,078,347 | 11/1913 | Haas | 137/519.5 X |
| 1,100,219 | 6/1914 | Butters | 137/533.15 |
| 2,916,042 | 12/1959 | Brady | 137/519.5 X |
| 3,322,145 | 5/1967 | Prosser | 137/519.5 X |
| 3,407,827 | 10/1968 | Follett | 137/460 X |
| 3,977,430 | 8/1976 | Bushee | 137/460 |
| 4,030,520 | 6/1977 | Sands | 137/519.5 X |
| 4,257,448 | 3/1981 | Shiu | 137/460 |

Primary Examiner—Robert G. Nilson
Attorney, Agent, or Firm—Leonard Bloom

[57] ABSTRACT

The present invention relates to an automatic overflow control apparatus for a pipeline passage. Specifically, this invention is suitable for use in a pipeline having a low pressure flow. The apparatus is of the type having a housing, an inlet port connected to an external flow supply, an outlet port, a flow channel being positioned between, and in communication with the inlet port and the outlet port and a safety valve having a ball member disposed in the flow channel, to prevent overflow through the apparatus. The safety valve has a valve seat having an elastic annular shell wherein the ball member may be seated, deforming the shell and being circumferentially gripped therein, thereby sealing the flow channel automatically controlling overflow which can rupture the pipeline.

10 Claims, 6 Drawing Figures

AUTOMATIC OVERFLOW CONTROL APPARATUS FOR THE PIPELINE PASSAGE

BACKGROUND OF THE INVENTION

A. Field of the Invention

This invention relates to an automatic overflow control apparatus for a natural gas pipeline.

B. Prior Art

Recently, the use of natural gas in private homes has become popular. Ideally, the most convenient method to transmit the natural gas to the private home is by direct hook-up to the natural gas pipeline. However, a severe potential for danger exists in such arrangement. In the use of propane gas, the amount of gas contained in the gas can is limited. Thus, even if the gas supply conduit is leaking due to breakage, corrosion or other reasons, it is quite easy to handle and control. However, in the case of natural gas pipelines, the natural gas is supplied continuously from the gas company making the potential loss from leakage unlimited. Obviously, this creates a danger that is much more severe than that encountered by using propane gas. Furthermore, in that all the gas supply conduits are low pressure conduits, when the reducing pressure station is out of order, the normally high pressure natural gas flow will rupture the low pressure pipe resulting in a serious problem.

SUMMARY OF THE INVENTION

Accordingly, the object of this invention is to provide an automatic overflow control apparatus to automatically seal the pipeline passage in the event of excessive pressure in the pipeline or in the event of leakage in the gas supply conduit due to breakage, corrosion or other related accidents that can occur resulting in a gas leak.

For the above said object and other further objects, the technical background, parts and features of this invention will be understood from the detailed description of the preferred embodiments below with reference to the annexed drawings.

DETAILED DESCRIPTION OF THE PREFERRED EMBODIMENT

Figure 1:
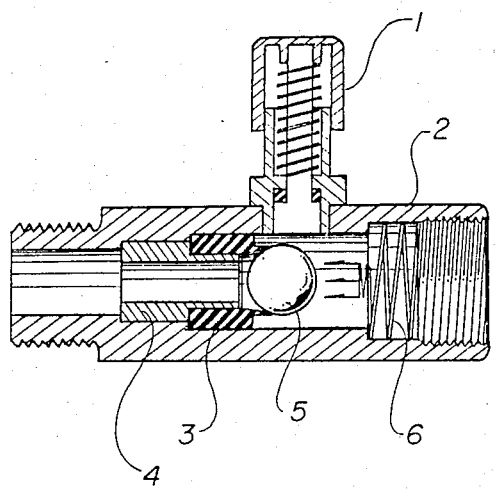
FIG. 1 is a side view, in cross-section, showing shutting the passage of the first embodiment of this invention.
Figure 2:
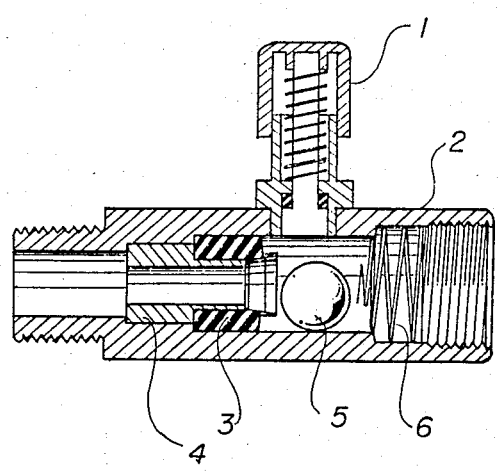
FIG. 2 is a side view, in cross-section, showing without shutting the passage of the first embodiment of this invention.

Referring now to the drawings, in FIGS. 1 and 2 there is illustrated the apparatus for automatically shutting the pipeline passage (the flow channel). This apparatus is comprised of a cylindrical sealing member (safety valve) 3 arranged near a gas supply port (inlet port). A preferably stainless steel ball (ball member) 5 is arranged to block the opening at the front end (the inlet end) of said cylindrical member (safety valve). A position spring 6 (FIGS. 1, 2 and 2A) or an offset round steel piece (annular offset member) 7 (FIG. 3) is also provided. A set release button 1 is engaged at the top of the pipeline (the flow channel) for hitting down (contacting) the ball 5 dislodging it from the opening and allowing the gas to pass through the pipeline (flow channel) immediately. The detailed description will be understood as hereinafter described.

Figure 2A:
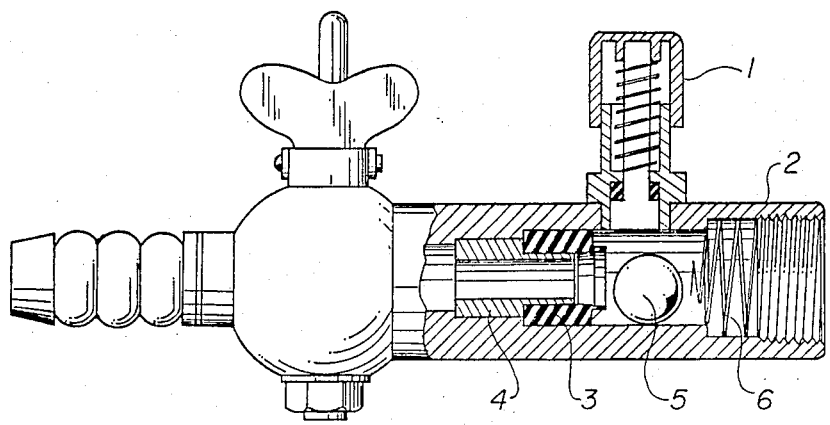
FIG. 2A shows the first embodiment secured to a valve structure.
Figure 3:
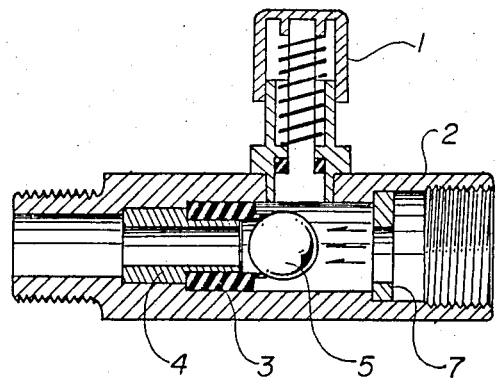
FIG. 3 is a side view, in partial cross-section, showing shutting the passage of the second embodiment of this invention.
Figure 5:
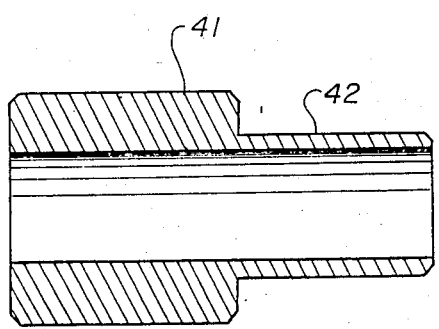
FIG. 5 is an enlarged side view, in cross-section, of the bushing of this invention.
Figure 4:
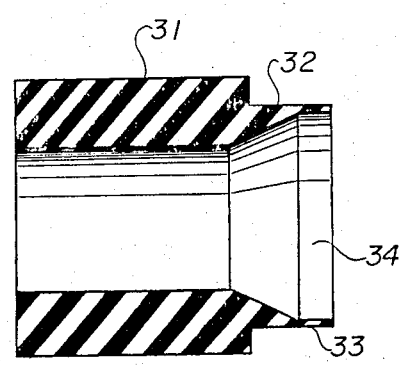
FIG. 4 is a side view, in cross-section, of the cylindrical rubber of this invention.

The equipment for automatically closing the pipeline (flow channel) in this apparatus is comprised of a pipeline (housing) 2 having an inlet port, an outlet port and a flow channel therebetween. This housing 2 may be a separate component communicating with a natural gas pipeline at a gas supply port (an inlet port) (as shown in FIG. 1) or said housing may be formed integrally with said natural gas pipeline or with other components (as shown in FIG. 2A). The cylindrical sealing member (safety valve) 3 is hollow and cylindrical in shape with the inner diameter thereof being smaller than the diameter of the ball 5. With particular reference now to FIG. 4, in addition to FIGS. 1-3, the safety valve 3 is comprised of a main body 31 provided with an annular projection (outwardly diverging valve seat) 32 having an outlet end being positioned at the front end (inlet end) of the main body portion being formed integrally therewith. The valve seat 32 has an outer diameter being smaller than that of the main body 31. Also, the valve seat 32 is further provided with an inclined inner taper surface. An annular film (annular shell) 33 is integrally formed to the outer end (inlet end) of the annular projection (valve seat) 32 and has an inner diameter being smaller than that of the ball 5. A bushing 4 is also provided. Said bushing 4 is hollow and cylindrical in shape. The main body (rearward outlet portion) 41 of bushing 4 is provided with an outlet end being formed integrally with an annular thin ring (annular forward portion) 42 on the front end (inlet end) of the main body (rearward outlet portion) 41. Said annular thin ring (annular forward portion) 42 is provided with an outer diameter being of almost the same size as the inner diameter of the main body 31 of safety valve 3. Both said annular thin ring (annular forward portion) 42 and said main body of the cylindrical rubber (safety valve) 3 have almost the same length along their longitudinal axis. The annular forward portion 42 of bushing 4 is inserted into the outlet end of the main body 31 by means of a frictional tight fit. The inner diameter of the main body 31 is a little smaller than the outer diameter of the main body (rearward outlet portion) 41. Also the engagement of the outer surface of the main body 31 and the inner surface of the pipeline passage (the flow channel) is arranged by means of frictional tight fit. The ball 5 is provided to engage with the annular film (elastic annular shell) 33 at one end. A position spring 6 (FIGS. 1, 2 and 2A) or an offset round steel piece (annular offset member) 7 is provided at the other end (inlet end) of the ball 5. The spring 6 is used to restrict the ball 5 from rolling away from the annular shell 33 and to keep the ball 5 at the proper position. The member 7 is used not only to prevent the ball 5 from rolling away from the annular shell 33 but also to guide the flow passing through the offset hole (inlet end) to move the ball 5. Because the outer diameter of the annular shell 33 at the inlet end of the safety valve is smaller than the inner diameter of the pipeline passage (flow channel), i.e., there is somewhat clearance between the outer surface of the annular shell 33 and the inner surface of the flow channel. During the gas flow being operated in the normal condition (the pressure at both sides of the ball 5 are equal), the ball 5 will not block the opening 36 in the annular shell 33. However, when the gas pipe is burning, or broken, or when the reducing pressure station is out of order, or the gas valves are open, it results in the gas flow rushing into the film opening 34 of the safety valve, producing a pressure difference between both sides of the opening 34. This induces the gas flowing into the opening 34 to produce a strong force to urge the ball 5 into the opening 34, blocking said opening 34. Because the valve seat 32 is provided with an inclined outwardly diverging inner surface it restricts the further movement of the ball 5 therein. Said annular shell 33 is much thinner and elastically outwardly extending, so that said ball 5 can deform said shell 33 and be firmly held (gripped) therein effectively shutting off the flow channel. The specific feature of this invention is related to the low pressure and super low pressure in the pipeline; the force that moves the ball is virtually small, thus the ball 5 is able to be surroundingly held (circumferentially gripped) and kept in place by the annular shell 33 at the inlet end of the valve seat 32 of the safety valve.

It will be appreciated by those skilled in the art that even though the present invention has been described above with reference to gas flows and natural gas pipelines, the teachings herein are equally applicable to liquid flows as well as other gas flows.

What is claimed is:

1. In an automatic overflow control apparatus of the type having a housing, an inlet port connected to an external flow supply, an outlet port, a flow channel being positioned between, and in communication with the inlet port and the outlet port, and a safety valve having a ball member disposed in the flow channel, to prevent overflow through the apparatus, wherein the improvement being the safety valve comprising:
   a main body portion having an inlet end and an outlet end;
   a valve seat having an inlet end, and an outlet end being integrally formed on the inlet end of the main body portion and extending therefrom; and
   an elastic annular shell integrally formed on the inlet end of the valve seat, wherein the ball member may be seated in the valve seat, deforming the shell and being gripped therein, thereby sealing the flow channel.

2. The device of claim 1, further having a bushing being disposed in the flow channel, being positioned in axial alignment with the safety valve, said bushing comprising:
   a rearward outlet portion having an inlet end and an outlet end; and
   an annular forward portion being integrally formed on the inlet end of the said rearward outlet portion, said forward portion being received in the outlet end of the main body portion of the safety valve for fluid communication therebetween.

3. The device of claim 1, wherein the housing is further provided with an aperture formed therein, said aperture terminating in the flow channel and in a position adjacent to the annular shell of the safety valve; a resiliently-biased set release button; a stem, being carried by the set release button, said stem being slidably positioned in the aperture for upward and downward movement therein at substantially right angle to the longitudinal axis of the flow channel, for slidably engaging the ball member when said ball member is seated in the valve seat, thereby unseating said ball member.

4. The apparatus of claim 1, wherein the valve seat being outwardly diverging.

5. The apparatus of claim 1, wherein the ball member may be seated in the valve seat, deforming the elastic annular shell and being circumferentially gripped therein.

6. The apparatus of claim 1, wherein the external flow supply is a gas.

7. The apparatus of claim 1, wherein the external flow supply is a liquid.

8. The apparatus of claim 1, wherein a spring member is disposed in the flow channel in a position forwardly of the ball member.

9. The apparatus of claim 1, wherein an annular offset member is disposed in the flow channel in a position forwardly of the ball member.

10. An automatic overflow control apparatus comprising:
    a housing having an inlet port, being connected to an external flow supply source, and an outlet port formed therein, and further having a flow channel formed therein, said flow channel being positioned between, and in communication with the inlet port and the outlet port;
    a safety valve having a ball member disposed in the flow channel, to prevent overflow through the apparatus, said safety valve being provided with a main body portion having an inlet end and an outlet end;
    an outwardly diverging valve seat having an inlet end, and an outlet end said valve seat being integrally formed on the inlet end of the main body portion and extending therefrom;
    an elastic annular shell integrally formed on the inlet end of the valve seat, wherein the ball member may be seated in the valve seat, deforming the shell and being circumferentially gripped therein, thereby sealing the flow channel;
    a bushing being disposed in the flow channel, being positioned in axial alignment with the safety valve, said bushing being provided with a rearward outlet portion having an inlet end and an outlet end;
    an annular forward portion being integrally formed on the inlet end of the said rearward outlet portion, said forward portion being received in the outlet end of the main body portion of the safety valve for fluid communication therebetween, wherein the housing is further provided with an aperture formed therein, said aperture terminating in the flow channel and in a position adjacent to the annular shell of the safety valve;
    a resiliently-biased set release button;
    a stem, being carried by the set release button, said stem being slidably positioned in the aperture for upward and downward movement therein at substantially right angle to the longitudinal axis of the flow channel, for slidably engaging the ball member when said ball member is seated in the valve seat, thereby unseating said ball member; and
    means for restraining axial movement towards the inlet port of the ball member within the flow channel, said means being disposed in said flow channel positioned forwardly of the ball member.

* * * * *